United States Patent Office 3,418,340
Patented Dec. 24, 1968

3,418,340
PROCESS FOR PRODUCING
PROPYLENE OXIDE
Joseph L. Russell, Ridgewood, N.J., assignor to Halcon International Inc., a corporation of Delaware
No Drawing. Filed Jan. 24, 1966, Ser. No. 522,382
2 Claims. (Cl. 260—348.5)

ABSTRACT OF THE DISCLOSURE

This invention relates to an improved process for the production of propylene oxide which includes the separation of oxygen from the unreacted propylene effluent prior to recycle.

The present invention relates to the production of an epoxy compound, propylene oxide, and more particularly to a process where the propylene oxide is produced by the reaction between propylene and an organic hydroperoxide.

Epoxy compounds are very valuable and important materials of commerce. Previous workers have employed processes for the epoxidation of various olefinic materials such as propylene employing very active materials such as peracids. However, the use of these peracid materials was not satisfactory in light of the high cost and somewhat non-selective reaction.

Recently, important advances have been made in the field of the epoxidation of olefinically saturated compounds to the corresponding oxirane compounds. These important advances have involved the discovery that organic hydroperoxides can be employed in the convenient and highly selective epoxidation of olefinically unsaturated compounds.

It is an object of the present invention to provide an improved process for the production of propylene oxide.

Another object is to provide a method for the reutilization of unreacted propylene recovered from the reaction mixture.

These and other objects of the present invention will be apparent from the following description.

According to the basic process, propylene and an organic hydroperoxide are reacted to form propylene oxide and an alcohol corresponding to the starting hydroperoxide. It is customary to operate at low olefin conversions per pass, e.g., from 10 to 30%, to obtain high selectivity. Consequently, large amounts of propylene must be recycled at some expense, or otherwise disposed of, for example, by polymerization or cracking. The polymerization may be conducted so as to form low molecular weight polymers, e.g., dimers, trimers, etc., or high molecular weight polymers, e.g., polypropylene or propylene copolymers. One large use for propylene is in the manufacture of propylene polymer for use in gasoline, plastics, etc. In the case of cracking, the unreacted propylene is treated in a cracking furnace to form ethylene and other pyrolysis products. In continuous commercial scale operation the unreacted propylene is often recycled for economy and efficiency. Whichever method of utilizing the unreacted propylene is chosen, difficulties are encountered. For example, it is found that impurities which are very difficult to remove from propylene oxide, e.g., methyl formate, are present in the product stream, that the flammability level and even the detonation level of propylene-oxygen mixtures are approached or exceeded at certain points in the process. In addition, not only is the epoxidation product adversely affected but the unreacted propylene is unsuitable for polymerization or cracking purposes.

The present invention is based upon the discovery that not all of the oxygen from the hydroperoxide reacts with the propylene and that the reactor effluent through normal epoxidation, catalyzed or uncatalyzed, contains from a few tenths of 1% to several percent of dissolved oxygen and that the oxygen content in the propylene rises cumulatively as long as some propylene is being recycled. It has further been found that the unreacted propylene cannot be reutilized, e.g., by being recycled or polymerized, unless the oxygen content is lowered to certain critical levels.

A convenient method of reducing the oxygen content of the propylene is to pass the reactor effluent through a fractional distillation column, or a plurality of fractional distillation columns, wherein the oxygen-containing light ends are recovered and condensed, and the liquid condensate separated from uncondensed material. The liquid condensate, consisting principally of propylene, may be recycled or used for other purposes. The majority of the oxygen is present in the uncondensed material although some is still present in the liquid recycle propylene. An alternate method to use of a distillation column would be to use an oil absorber-stripper. Another alternate method would be to remove a light ends fraction from the reactor contents. In still another method, the unreacted propylene recovered from the reaction mixture may be chemically treated to reduce the oxygen, e.g., by subjecting the propylene to oxidation conditions, e.g., by passing it over an oxidation catalyst to cause a controlled oxidation of propylene to by-products which can be readily removed without danger of forming flammable mixtures of which would be inert in the subsequent treatment of the propylene.

It is obvious that the oxygen content in the feed to an epoxidation reactor must be low enough to permit plant operation of that epoxidizer in a non-detonatable region. However, it is the discovery of this work that much less oxygen is allowable in the recycle than that which would correspond to operation in a non-detonatable or non-flammable region in the epoxidizer, even if detonatable operation is avoided by increasing the total pressure of the epoxidizer so as to maintain the oxygen in the liquid phase, i.e., so that there will be no gas phase in the epoxidizer.

The discovery that significant amounts of oxygen are formed in the epoxidation reaction forces one to employ a control on oxygen content of the propylene entering the epoxidation reaction. It is the finding of this invention that the oxygen content of the total propylene, both fresh feed and recycle, entering the epoxidation reactor must be below 3 mol percent and preferably below 1 mol percent. If the amount of oxygen in the propylene is higher than that cited, although still below detonatable or flammable levels, there are several difficulties encountered which make a feasible process unattainable. These difficulties can be best explained as follows: with a normal recycle of propylene, which would contain the cumulative oxygen make per pass, the oxygen level continues to rise in the epoxidizer. The first major effect encountered from such oxygen build-up is that involving direct attack of molecular oxygen on propylene in the epoxidizer. It is generally known to the art that propylene oxidizes with molecular oxygen in the temperature range used for epoxidation. This effect completely subverts one advantage attainable from the reaction of propylene and hydroperoxide, namely, formation of propylene oxide at very high selectivities with no formation of methyl formate. In this situation, the oxygen level builds up in the unreacted propylene, and consequently, in the epoxidation reactor as unreacted propylene is recycled, until a steady state is obtained, namely, the condition at which the net make of the free oxygen in the epoxidizer is consumed by direct oxygen attack by propylene. This results in highly unsatisfactory operation in view of the deleterious by-products known to occur in conventional propylene oxidation with molecular oxygen.

The second difficulty which occurs either concommittantly or prior to the first is one of hazardous and uneconomic operation as the oxygen level rises. It is very undesirable to operate the epoxidizer with a gas phase containing molecular oxygen because of explosion hazards. This can be avoided by use of a high enough pressure so as to maintain all of the oxygen dissolved in the liquid phase. However, due to the high volatility of oxygen, the pressures required in the epoxidizer rise markedly as the concentration of oxygen in the recycle goes up. Operations become impractical economically, or hazardous due to this effect. In addition, if the oxygen level is allowed to rise it is economically impractical to effect a separation of propylene and oxygen, for example by high pressure distillation, without having a gas phase in this fractionation zone which is in the flammable or detonatable region. It is thus essential to purge oxygen at a rate such that the propylene recovery section of the plant can operate below the detonatable range in all sections of the plant.

The existence of excessive oxygen in recycle propylene also makes its subsequent use in other processing steps, such as alkylation or polymerization, near to impossible without costly prior treatment of the propylene.

The hydroperoxides which are employed in the invention are those having the formula ROOH wherein R is a substituted or unsubstituted alkyl, cycloalkyl, or aralkyl radical having about 3 to 20 carbon atoms. R may be a heterocyclic or like radical.

Illustrative and preferred hydroperoxides are cumene hydroperoxide, ethylbenzene hydroperoxide, tertiary butyl hydroperoxide, cyclohexanone peroxide, tetrahydronaphthalene hydroperoxide, methyl ethyl ketone peroxide, methylcyclohexane hydroperoxide, and the like. A useful organic hydroperoxide compound for use in this invention is the peroxide product which is formed by the liquid phase molecular oxygen oxidation of cyclohexanol.

Temperatures which can be employed in the present invention can vary quite widely depending upon the reactivity and other characteristics of the particular system. Temperatures broadly in the range of about $-20$ to $200°$ C., desirably 0 to $150°$ C., and preferably $50$–$120°$ C. can be employed. The reaction is carried out at pressure conditions sufficient to maintain a liquid phase. Although subatmospheric pressures can be employed, pressures usually in the range of about atmospheric to about 1000 p.s.i.a. are most desirable.

The ratio of propylene to organic peroxy compounds can vary over a wide range. Generally, mol ratios of propylene to hydroperoxide broadly in the range of from 0.5:1 to 100:1, desirably from 1:1 to 20:1 and preferably from 2:1 to 10:1 are employed.

The concentration of hydroperoxides in the propylene oxidation reaction mixture at the beginning of the reaction will normally be one percent or more although lesser concentrations will be effective and can be used.

The propylene oxidation reaction can be carried out in the presence of a solvent, and in fact, it is generally desirable that one be used. In general, aqueous solvents are not contemplated. Among the suitable substances are hydrocarbons, which may be aliphatic, naphthenic or aromatic, and the oxygenated derivatives of these hydrocarbons. Preferably, the solvent has the same carbon skeleton as the hydroperoxide used, so as to minimize or avoid solvent separation problems.

The epoxidation reaction with which the present invention is concerned may take place in the presence or absence of metallic epoxidation catalysts. If employed, the catalysts may include compounds of V, Mo, Ti, W, Se, Mb, Te, preferably the first four mentioned.

The amount of metal in solution used as catalyst in the epoxidation process can be varied widely, although as a rule it is desirable to use at least 0.00001 mol and preferably 0.002 to 0.03 mol per mol of hydroperoxide present. Amounts greater than about 0.1 mol seem to give no advantage over smaller amounts, although amounts up to 1 mol or more per mol of hydroperoxide can be employed. The catalyst remains dissloved in the reaction mixture throughout the process and can be reused in the reaction after removal of the reaction products therefrom. The molybdenum compounds include the molybdenum organic salts, the oxides such as $Mo_2O_3$, $MoO_3$, molybdic acid, the molybdenum chlorides, molybdenum fluoride, phosphate, sulfide, and the like. Heteropoly acids containing molybdenum can be used as can salts thereof; examples include phosphomolybdic acid and the sodium and potassium salts thereof. Similar or analogous compounds of the other metals mentioned may be used, as may mixtures thereof.

The catalytic components may be employed in the epoxidation reaction in the form of a compound or mixture which is initially soluble in the reaction medium. While solubility will, to some extent depend on the particular reaction medium employed, a suitable soluble substance contemplated by the invention would include hydrocarbon soluble, organo-metallic compounds having a solubility in methanol at room temperature of at least 0.1 gram per liter. Illustrative soluble forms of the catalytic materials are the naphthenates, stearates, octoates, carbonyls, and the like. Various chelates, association compounds and enol salts, such for example, as acetoacetonates may also be used. Specific and preferred catalytic compounds of this type for use in the invention are the naphthenates and carbonyls of molybdenum, titanium, tungsten, rhenium, niobium, tantalum and selenium. Alkoxy compounds such as tetrabutyl titanate and like tetra alkyl titanates are very useful. However, it has been discovered that four of the catalysts cited have particular utility in the epoxidation of a primary olefin such as propylene. These four catalysts are molybdenum, titanium, vanadium and tungsten. It has been discovered that their activity for epoxidation of the primary olefins is surprisingly high and can lead to high selectivity of propylene to propylene oxide. These high selectivities are obtained at high conversions of hydroperoxide, 50% or higher, which conversion levels are important for commercial utilization of this technology.

Basic substances can be employed in the present invention. Such basic substances are alkali metal compounds or alkaline earth metal compounds. Particularly preferred are the compounds of sodium, potassium, lithium, calcium, magnesium, rubidium, cesium, strontium, and barium. Compounds which are employed are those which most preferably are soluble in the reaction medium. However, insoluble forms can be employed and are effective when dispersed in the reaction medium. Organic acid compounds such as a metal acetate, naphthenate, stearate, octoate, butyrate, and the like can be employed. Additionally, inorganic salts such as Na carbonate, Mg carbonate, trisodium phosphate, and the like can also be employed. Particularly preferred species of metal salts include sodium naphthenate, potassium, stearate, magnesium carbonate, and the like. Hydroxides and oxides of alkali and alkaline earth metal compounds can be used. Examples are NaOH, MgO, CaO, $Ca(OH)_2$, KOH and the like, alkoxides, e.g. Na ethylate, K cumylate, Na phenate, etc., can be used. Amides such as $Na\ NH_2$ can be used as can quaternary ammonium salts. In general, any compound of alkali or alkali earth metals giving a basic reaction in water can be used.

The basic compound is employed during the epoxidation reaction in amount of from 0.05 to 10 moles/mol of epoxidation catalyst, desirably, 0.25 to 3.0 mols, and preferably 0.50 to 1.50 mols. It has been found that as a result of the incorporation of the basic compound in the reaction system, significantly improved efficiencies in the utilization of the organic hydroperoxides in the epoxidation is achieved.

That is, using the basic compound there results a higher yield of oxirane compound based on hydroperoxide consumed. Also, of the hydroperoxide consumed, a greater amount is reduced to the alcohol instead of other undesirable products through the invention.

Additionally, through use of the basic compound it is possible to employ lower propylene to hydroperoxide ratios and thus to improve propylene conversions while retaining satisfactory high reaction selectivities.

During the epoxidation the organic hydroperoxide is selectively reduced to the corresponding alcohol which is conveniently recovered and/or converted to the hydroperoxide and reused or converted to another product.

In the foregoing description the term propylene is to be understood as including mixtures of propylene and propane. Commercially available propylene, for example, contains some propane.

The following examples illustrate the present invention without however limiting the same thereto.

EXAMPLE I

The charge to an epoxidation reactor consists of 1,000 grams of ethylbenzene oxidate prepared by the air oxidation of ethylbenzene and containing 120 grams of ethylbenzene hydroperoxide, 365 grams of a mixture comprising 66 mol percent propylene, 30 mol percent propane and 4 mol percent oxygen, and 1.3 grams of molybdenum octanoate solution containing 5 weight percent molybdenum.

The epoxidation reaction is carried out at 135° C. and 1000 p.s.i.a. (70.31 kg./sq. cm.). Under these conditions no gas phase is present. After sixty minutes of reaction time, hydroperoxide conversion is essentially complete. The selectivity to propylene oxide, defined as moles of propylene oxide per mol of hydroperoxide reacted, is 50 mol percent.

The same type of impurities are observed in the reactor effluent as are formed by a direct molecular oxygen attack on propylene. These include acids, esters, $CO_2$, and the like. Most detrimental to a workable process, however, is the observation of the presence of methyl formate which is found to be inseparable from propylene oxide by conventional distillation techniques.

Unreacted propylene is separated from the reactor effluent by fractional distillation from higher boiling point material and subjected in the vapor phase to polymerization conditions over conventional catalysts usually employed to yield tetrapropylene. Operation for only a short period of time indicates that the propylene is completely unsuitable for such use. In particular, heavy coking and rapid deactivation of the catalyst is observed.

An additional observation is that the level of oxygen in the unreacted propylene leads to the presence of detonatable mixtures of oxygen-propylene in the gas phase in those sections of the system which recover propylene. For example, any conventional propylene recycle scheme for the foregoing process would give up to 50% oxygen in a gas phase containing propylene-propane at least in some portion of the recovery system. It is not possible economically to avoid this oxygen buildup in conventional recycle operations.

EXAMPLE II

A run similar to Example I is made with the following charge: 1,000 grams of ethylbenzene oxidate containing 120 grams of ethylbenzene hydroperoxide, 350 grams of a mixture of fresh and recycle propylene comprising 69.2 mol percent propylene, 30 mol percent propane and 0.8 mol percent oxygen, and 1.3 grams of molybdenum octanoate containing 5 weight percent molybdenum.

In this run epoxidation is carried out at 135° C. and 850 p.s.i.a. (59.76 kg./sq. cm.) for 60 minutes. Conversion of hydroperoxide is complete and selectivity, as defined in Example I, is 60 mol percent.

The recycle propylene in this reaction is prepared by a separation from the reactor effluent of Example I by fractional distillation. The oxygen level of the unreacted, recycle propylene is reduced by a high pressure fractionation of oxygen from propylene to yield a liquid propylene phase containing about 0.08 mol percent oxygen. This propylene phase is combined with a portion of the gas phase from such a fractionation so that the combined recycle and fresh propylene feed contained 0.8 mol percent oxygen.

Reduction in products of reaction between propylene and oxygen is observed. Most important is the observation that propylene oxide of sales specification quality is obtained from the reactor effluent by simple distillation techniques.

The liquid phase propylene from the high pressure fractionation in this example is then subjected to the polymerization conditions to make tetrapropylene as in Example I and provides sharply improved performance approaching that for oxygen-free propylene.

EXAMPLE III

The unreacted propylene obtained according to the procedure of Example I is treated in the following manner before being recycled: The propylene in gaseous phase is passed over a vanadium oxidation catalyst. The degree of oxidation is controlled to maintain the oxygen concentration in the effluent of oxidation at about 0.1 mol percent.

EXAMPLE IV 350 grams of unreacted propylene whose oxygen content has been lowered according to the procedure of Example II is fed to a reactor together with 1000 grams of ethylbenzene oxidate containing 120 grams of ethylbenzene hydroperoxide and 1.35 grams of molybdenum octanoate containing 5 weight percent molybdenum. In this case only the liquid phase from the high pressure fractionation zone is recycled.

Epoxidation is carried out at 135° C. and 700 p.s.i.a. (49.21 kg./sq. cm.) for 60 minutes. Ethylbenzene hydroperoxide conversion is essentially complete with a selectivity to propylene oxide of 60%.

In this case the reactor effluent contains a non-detectable level of methyl formate. Furthermore, a simple fractionation of this effluent gives a propylene oxide which contains nil methyl formate.

What is claimed is:

1. A process of preparing propylene oxide which comprises reacting propylene with an organic hydroperoxide at temperatures from about −20° C. to about 200° C. under pressures sufficiently great to maintain a liquid phase, thereby forming propylene oxide in the presence of unreacted propylene, and removing oxygen from at least part of the unreacted propylene before recycling to the reaction vessel such that the total $O_2$ content in the reaction vessel is below 3%.

2. A process according to claim 1 wherein the pressure is from atmospheric to about 1,000 p.s.i.a. and the temperature is from about 0° C. to about 150° C.

References Cited

FOREIGN PATENTS 6,507,187   12/1965   Netherlands.

HENRY R. JILES, *Primary Examiner.*

S. WINTERS, *Assistant Examiner.*